United States Patent [19]

Schmidt

[11] Patent Number: 4,694,118

[45] Date of Patent: Sep. 15, 1987

[54] AERIAL TERMINAL FOR TELECOMMUNICATION CABLES

[75] Inventor: Gunter P. Schmidt, Spring Hill, Fla.

[73] Assignee: G-A-T-M Corporation, Brooksville, Fla.

[21] Appl. No.: 786,461

[22] Filed: Oct. 10, 1985

[51] Int. Cl.[4] .......................... H02G 15/10; H02G 7/06
[52] U.S. Cl. .......................................... 174/41; 174/59;
174/77 R; 292/346; 411/910
[58] Field of Search .................... 174/41, 44, 59, 60, 174/77 R, 93

[56] References Cited

U.S. PATENT DOCUMENTS

| | | | |
|---|---|---|---|
| 1,862,811 | 6/1932 | Strong | 174/41 C |
| 3,701,835 | 10/1972 | Eisele et al. | 174/41 |
| 3,836,696 | 9/1974 | Gressitt et al. | 174/41 |

FOREIGN PATENT DOCUMENTS 194451  2/1965  Sweden ................................ 174/41

Primary Examiner—Laramie E. Askin
Attorney, Agent, or Firm—Pettis & McDonald

[57] ABSTRACT

An aerial terminal for telecommunication cables characterized by its construction which includes a substantially weathertight chamber for receiving a segment of the telecommunication cable and permitting individual wire pairs to be separated therefrom. This chamber is known as the splicing housing. The aerial terminal further includes a terminal housing which communicates with the splicing housing so that individual wire pairs may be operatively connected to a telecommunication terminal block for ultimate connection to individual subscriber lines. In addition to the general construction of the aerial terminal for ease of installation and access for the purpose of connecting individual subscriber lines to the telecommunication cable, the aerial terminal includes unique sealing sleeves for protecting the cable most effectively from adverse weather conditions. Unique locks are also disclosed for preventing unauthorized entry into the aerial terminal.

32 Claims, 14 Drawing Figures

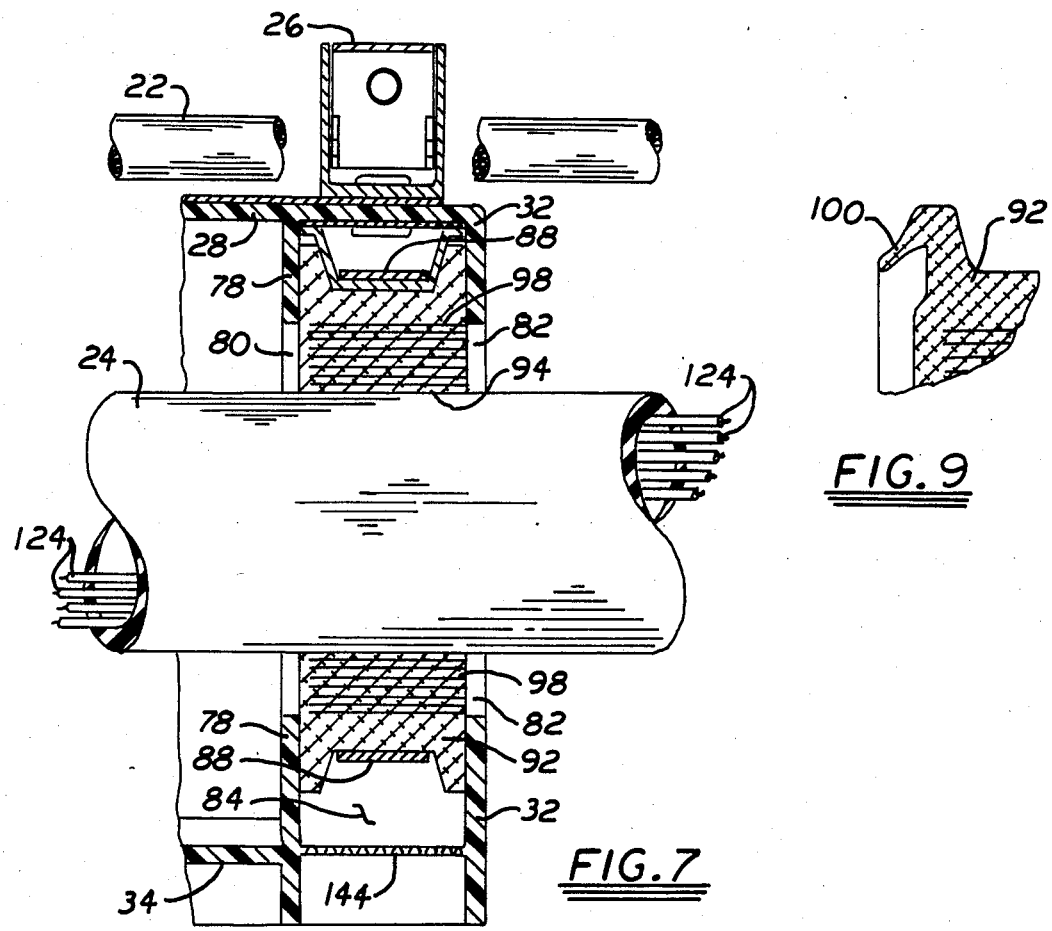
FIG. 7
FIG. 9
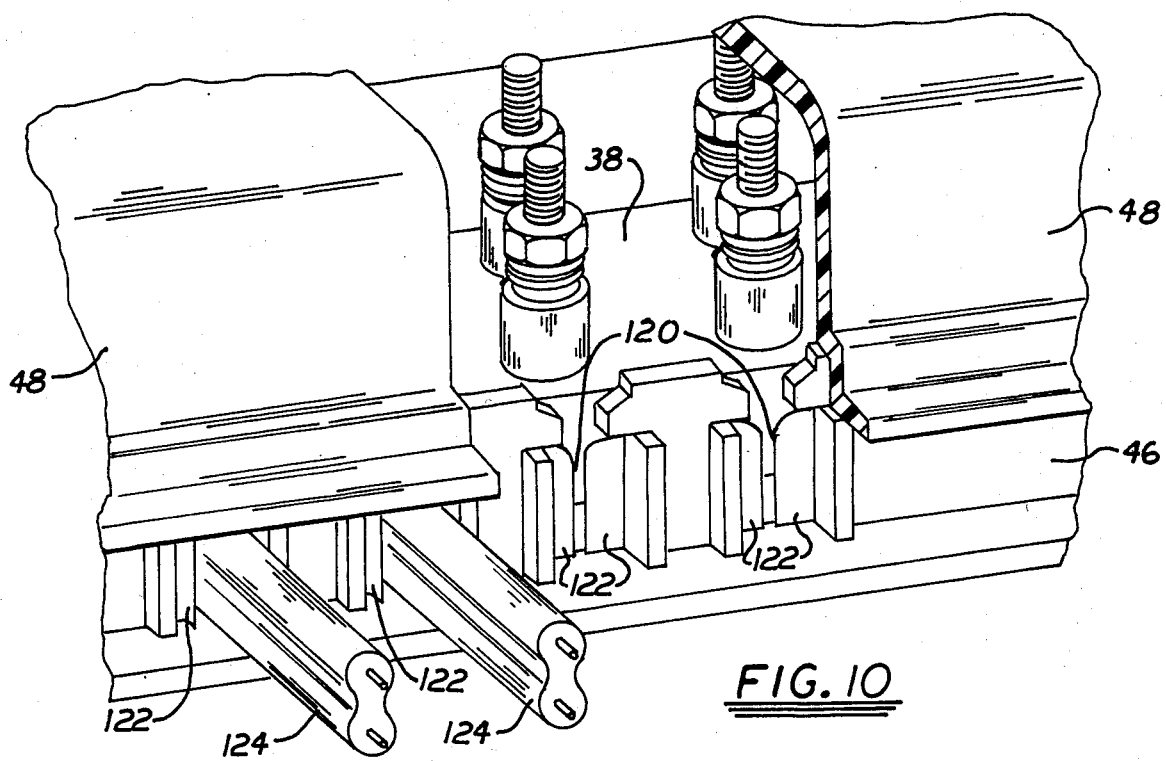
FIG. 10

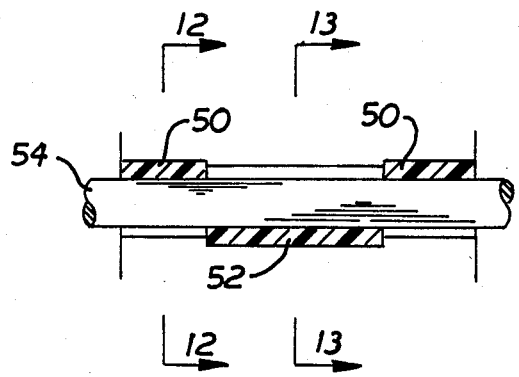
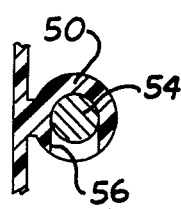
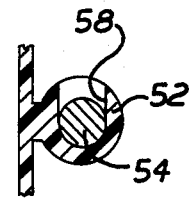
FIG.11  FIG.12  FIG.13
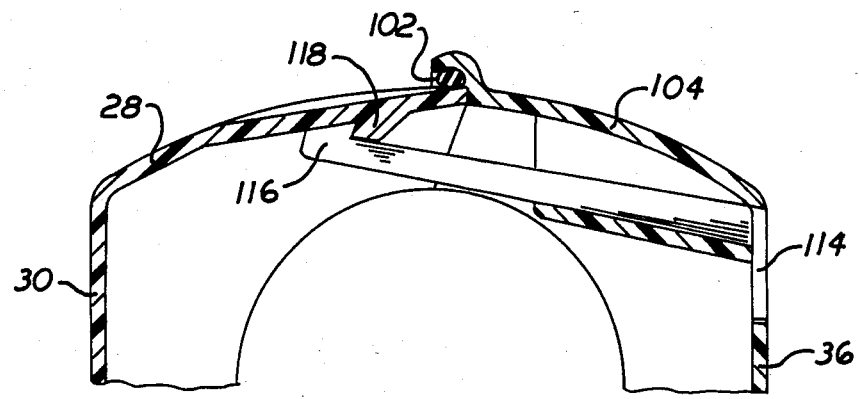
FIG.14

AERIAL TERMINAL FOR TELECOMMUNICATION CABLES

BACKGROUND OF THE INVENTION

1. Field of the Invention

The present invention is directed to an aerial terminal for telecommunication cables. The terminal comprises a splicing housing into which a first segment of the telecommunication cable is received and wherein individual wire pairs contained within the cable are accessed for ultimate connection to individual subscriber lines. The terminal further comprises a plurality of clamping means whereby the terminal is suspended from a second segment of the telecommunication cable in electrically grounded relation thereto. Disposed below the splicing housing, and in communication therewith, is a terminal housing into which a standard telecommunication terminal block is mounted. It is through this standard terminal block that individual subscriber lines are connected to the primary cable. The aerial terminal of this invention is characterized by its unique sealing sleeves which provide for an extremely weathertight seal around telecommunication cables of varying diameters. Both the splicing housing and the terminal housing are accessible from one side of the aerial terminal for ease of installation and maintenance. Unique locking means are provided for use in those installations where the splicing housing is to be permanently secured. Increased ease in connecting individual subscriber lines to the terminal block within the terminal housing is accomplished by virtue of a plurality of drop wire slots formed through the bottom of the terminal housing.

2. Description of the Prior Art

Above ground aerial terminals are well known and are used where local networks and long distance networks cannot be installed underground for economical or technical reasons. Many such above ground cable distribution terminals are in use today.

One primary disadvantage of current terminals involves the points of entry and exit of the telecommunication cable with respect to the terminal housing. Accordingly to current state-of-the-art constructions, the inlet and exit points are normally constructed in a step down, cone shape which is cut to fit, approximately, the external circumference of the telecommunication cable. A weathertight seal is virtually impossible to obtain for a number of reasons.

First, such telecommunication cables are constructed according to what is known as a figure eight cross-section. The upper portion of the eight is relatively smaller than the lower portion and contains a wire used not only to suspend the cable, but also to provide electrical grounding. The lower part of the eight contains individual wire pairs which are ultimately connected to subscriber lines. Thus, in order to enter the main cable for the purpose of splicing individual subscriber lines, it is necessary to separate the upper and lower halves of the cable. This is accomplished by cutting through the junction of the figure eight cross-section, and virtually always results in a non-round outer circumference of the cable to which wires will be spliced. Obviously, then, a weathertight seal cannot be obtained between such a non-round cable and a conical sleeve.

In order to obtain a better seal, it is standard practice in the industry to wrap the inlet and exit points with tape. However, as can easily be appreciated, aerial terminals and the cables passing therethrough are exposed to extreme weather conditions. The telecommunication cable is formed from one substance; the conical sleeves are normally formed from another substance; and the sealing tape is formed from yet another material. As a result of temperature variations, all three materials expand and contract at different rates, resulting in a non-weathertight seal. Water may enter the splicing chamber and even find its way onto the standard terminal block.

Yet another problem associated with current aerial terminal constructions involves access for splicing into the wire pairs contained within the primary cable and access to the terminal block for connecting individual subscriber lines thereto. As a matter of company policy, many telecommunication companies require that once the primary cable has been opened and spliced into the terminal block, the splicing chamber be permanently secured. Thereafter, access to only the terminal block is permitted. Repeated access to either the splicing or the terminal enclosures often results in fatigue and wear of their respective covers, further damaging the desired weathertight characteristics. In those installations where permanent locking of the splicing chamber is required, one means of accomplishing that today is through the use of glue. Not only will glue often fail under the adverse weather conditions to which aerial terminals are subjected, but also improper application of the glue to the mating surfaces will result in an unacceptable seal.

Problems have also been encountered with regard to acceptable means for inserting individual subscriber lines into the terminal chamber for connection to the terminal block. According to state-of-the-art constructions for aerial terminals, it is generally necessary to thread a free end of the subscriber line through an aperture and then to trim and connect the wire pairs to the terminal block. This is not only cumbersome and inconvenient, but also frequently results in improper subscriber line connections. Finally, as many as 25 individual subscriber line pairs may be entering a single aerial terminal. Convenient, yet effective, means are sorely needed for retaining these wire pairs adjacent the terminal rather than simply allowing them to hang therefrom.

It is therefore apparent that there is a great need in the art for an improved aerial terminal possessing significantly enhanced construction features relating not only to its ease of installation and use, but also providing enhanced weather protection characteristics and increased security features.

SUMMARY OF THE INVENTION

The present invention relates to an aerial terminal of the type utilized for connecting individual subscriber lines to a main telecommunication cable. The aerial terminal comprises a splicing housing defined by an enclosure dimensioned and configured to receive a first segment of the telecommunication cable therein. This first segment of the telecommunication cable is the portion containing individual subscriber line pairs for connection to individual subscribers. A plurality of clamping means are attached to the exterior of the splicing housing whereby the terminal may be suspended from a second segment of the telecommunication cable. This second segment is the insulated wire used for suspending and grounding the telecommunication cable. The aerial terminal further comprises a terminal housing which is attached to the splicing housing immediately therebelow. At this point, it should be noted that a variety of different sizes for the terminal housing may be provided dependent upon the maximum number of subscriber lines to be connected at that particular terminal. Apertures are provided whereby the splicing housing and the terminal housing are in internal communicating relation to each other so that subscriber wire pairs may pass from the main telecommunication cable into the terminal housing for operative attachment to a standard terminal block. The terminal block also includes contacts whereby individual subscriber drop wires may be operatively connected through the block to the telecommunication cable. A plurality of drop wire slots are formed through the terminal housing, and each slot is dimensioned and configured to receive an individual subscriber drop wire therein.

Both the splicing housing and the terminal housing have hinged covers thereon for obtaining access to the interior of the enclosure defining the splicing housing and the interior of the box defining the terminal housing. Both the splicing housing hinged cover and the terminal housing hinged cover pivot about a common hinge pin.

The splicing housing further comprises at least a pair of sealing sleeves with one of the sleeves being disposed in surrounding relation to the first segment of the telecommunication cable at each end of the splicing housing enclosure. The sealing sleeves are formed from a pliant material and comprise a substantially circular aperture formed axially therethrough. Each of the sleeves further includes a radial slit extending from the aperture to the perimeter of the sleeve so that the sleeve can be placed onto the outside of the telecommunication cable. So that a single sleeve may fit cables of different outside diameter, each sleeve further comprises a plurality of concentric, radially spaced apart cuts extending partially through the sleeve. By completing one of these partial cuts, the size of the circular aperture may be increased to surround telecommunication cables of different sizes.

Once each sleeve has been appropriately placed in surrounding relation to the telecommunication cable, the sleeves are then placed into a corresponding seal clamp which is operatively mounted within the splicing chamber in channels formed therein for that purpose. The seal clamps may accurately be characterized as hose clamps, and upon tightening the seal clamps, the seal sleeves will be compressed into intimate, weathertight contact with the exterior surface of the telecommunication cable. It should be noted that the side of each sleeve containing the concentric cuts will be oriented toward the interior of the splicing housing so that the smooth side of each sleeve abuts the splicing housing end walls.

Insulation and shielding may then be removed from the telecommunication cable between the two sleeves and appropriate splicing operations made for the purpose of connecting wire pairs to the terminal block. Once that operation is complete, upon closing and fastening the splicing housing hinged cover, a truly weather tight seal is provided at each end of the splicing housing. Further weathertight integrity is provided at the seam between the hinged cover and the top of the splicing housing by the provision of a sealing gasket along the open edge of the top.

While any suitable means may be used for fastening the hinged cover to the remainder of the splicing housing once the splicing operation has been completed, a preferred embodiment involves the use of threaded fasteners. In those circumstances where permanent locking of the splicing housing is required, the aerial terminal of this invention further comprises a plurality of security caps, one of each of said caps being attachable to a corresponding one of the threaded fastening means. The security caps mechanically lock onto a washer through which the threaded fastener has been inserted and tightened and may not be removed therefrom without destroying the cap. Also, according to this preferred embodiment, the safety caps are colored differently from the splicing housing so that one may observe, remotely, the secure condition of the splicing housing of the aerial terminal. According to a second embodiment for permanently securing the splicing housing, hinged cover locking pins are provided which engage corresponding shoulders formed on the interior of the splicing housing to provide a permanent latch. Of course, means are also provided on the exterior of the splicing housing whereby standard security seals may be placed if it is not desired to lock the fastening means permanently.

As indicated above, the terminal housing is mounted immediately below the splicing housing and the interior thereof communicates with the interior of the splicing housing by means of apertures formed through their common walls. Wire pairs are passed through the apertures and connected to appropriate terminals on the standard terminal block. A plurality of fins are provided on the interior of the terminal housing box whereby the terminal block may be mounted therein in spaced apart relation from the box walls.

The splicing housing hinged cover as well as the terminal housing hinged cover each comprises a plurality of hinge sleeves formed in spaced apart relation along their hinged edges; and the spacing of the hinge sleeves is such that the splicing housing cover sleeves alternate with the terminal housing cover sleeves. Furthermore, each of the sleeves has a slot formed therein, and the interior of the slot is dimensioned and configured to pivot about the common hinge pin. Thus, because the terminal housing is mounted beneath the splicing housing, the hinged cover of the splicing housing opens downwardly while the hinged cover of the terminal housing opens upwardly. Another feature of the aerial terminal of this invention is that the hinged cover of the splicing housing is provided with at least one dimple, and the hinged cover of the terminal housing is provided with at least one corresponding protrusion. The shape and placement of the corresponding dimple and protrusion are such that when either cover is opened, it will be releasably held in that position by engagement of the protrusion with the corresponding dimple.

Drop wire slots are formed through the bottom of the terminal housing box and, when the housing hinge cover is open, one end of each drop wire slot is exposed so that individual subscriber wire pairs may be easily inserted therein for operative connection to appropriate terminals on the standard terminal block. Once the individual subscriber connections have been made and each subscriber drop wire has been placed within its corresponding drop wire slot, the terminal housing hinged cover is closed and fastened as by any suitable fastening means. The terminal housing box and its hinged cover are provided with appropriate tabs for the insertion of lead or plastic security seals therethrough to ensure that the terminal housing has not been opened or otherwise tampered with.

Finally, so that the individual subscriber drop wires do not merely dangle from the aerial terminal, a plurality of wire straps are attached to the bottom of the terminal housing box for the purpose of laying the drop wires therein. Each of the wire straps is of a substantially U-shaped configuration with one leg of each strap attached to the bottom of the terminal housing and the other leg being open so that the subscriber drop wires may be placed therein, rather than having to feed them therethrough. Both the splicing housing and the terminal housing are provided with ventilation slots in order to provide air circulation through their interiors. The slots are formed through the bottom of each housing so that rain water may not enter and are of relatively small size so as to impede the entry of insects into the interior of either housing. The ventilation slots are formed through the bottom of the splicing housing, and the drop wire slots define the ventilation slots through the bottom of the terminal housing.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 7 is a sectional view taken along line 7—7 of FIG. 5.

FIG. 9 is a fragmentary side elevation view of the sealing lip of the sealing sleeve of this invention.

FIG. 10 is a fragmentary perspective view showing the drop wire slots of this invention and their relationship to the terminal block mounted within the terminal housing.

FIG. 11 is a sectional view taken along line 11—11 of FIG. 3.

FIG. 12 is a sectional view taken along line 12—12 of FIG. 11.

FIG. 13 is a sectional view taken along line 13—13 of FIG. 11.

FIG. 14 is a sectional view similar to that of FIG. 8 illustrating a second embodiment for the permanent locking means used to secure the splicing housing of this invention.

Similar reference characters refer to similar parts throughout the several views of the drawings.

DETAILED DESCRIPTION

Figure 1:
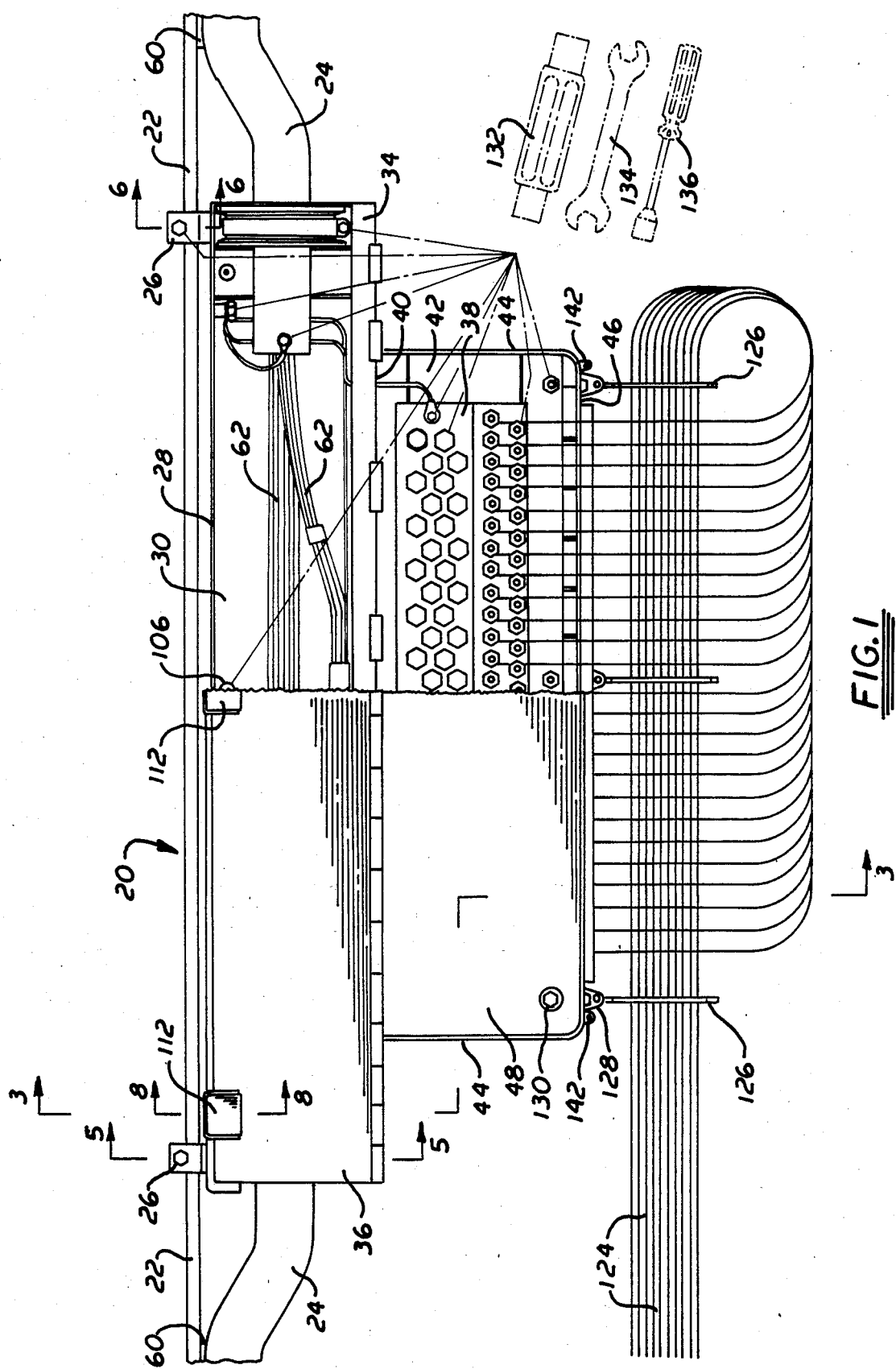
FIG. 1 is a front elevation view of the aerial terminal of this invention with the hinged covers cut away at the right side for the purpose of illustrating interior details.
Figure 2:
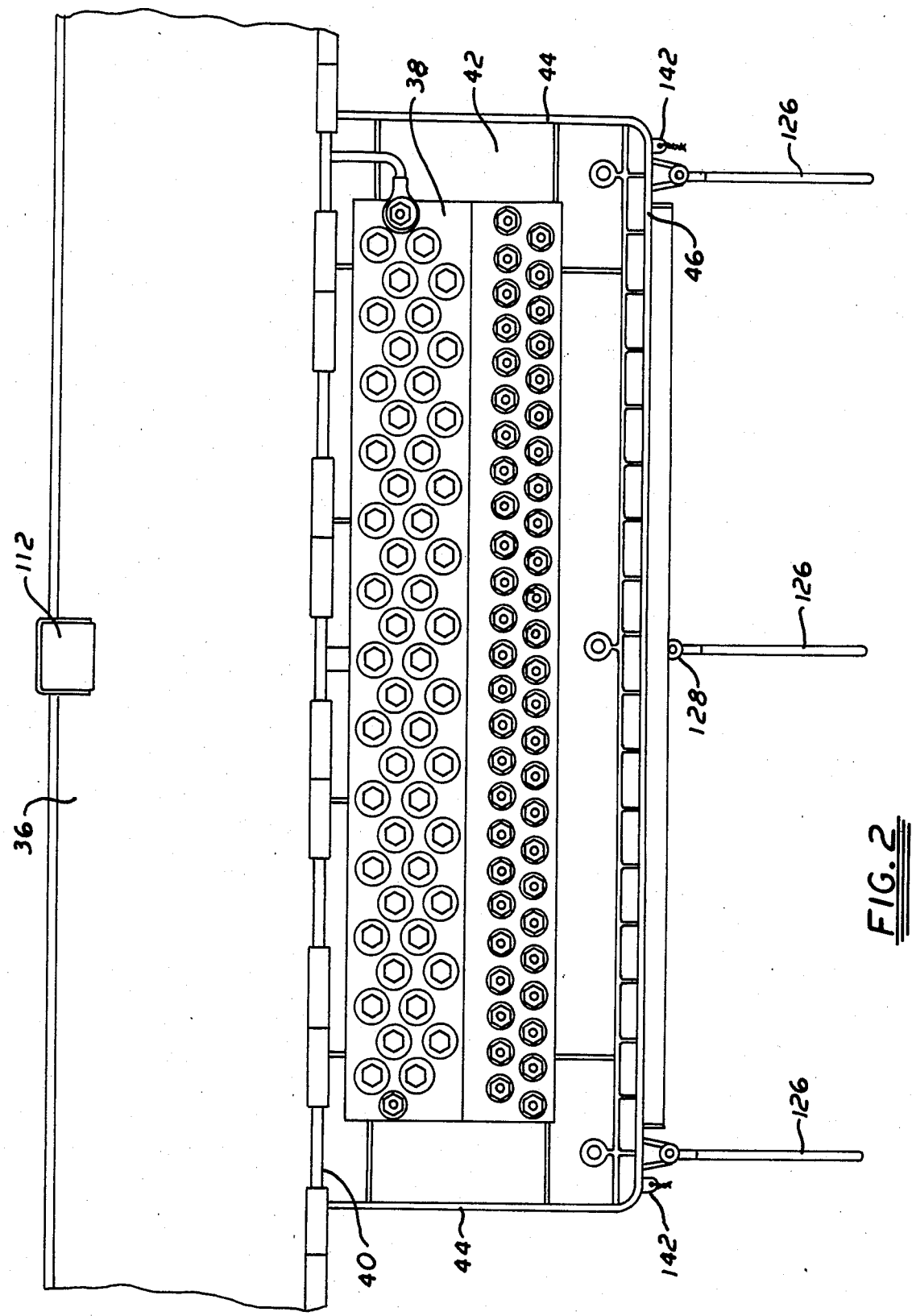
FIG. 2 is a partial front elevation view of the aerial terminal showing the opened terminal housing.

The aerial terminal of this invention is generally indicated as 20 throughout the several views of the drawings. Referring first to the view of FIG. 1, aerial terminal 20 is illustrated as being suspended from a second segment 22 of a standard telecommunication cable. A first segment 24 of the telecommunication cable is also shown and, as will be discussed in greater detail hereinafter, first segment 24 contains individual subscriber wire pairs for connection to the telecommunication system. Aerial terminal 20 is suspended from second segment 22 as by the clamping means 26.

The aerial terminal 20, in its preferred embodiment, is formed from high impact plastic that is resistant to extreme temperature variations. Aerial terminal 20 comprises a splicing housing defined by an enclosure having a top wall 28, a back wall 30, a pair of oppositely disposed end walls 32, a bottom wall 34, and a splicing housing hinged cover 36.

Fixedly attached to the splicing housing, and disposed immediately therebelow, is the terminal housing of aerial terminal 20. As seen in the fragmentary sectional view of Fig. 1, a standard terminal block 38 is mounted within a box defining the terminal housing. The terminal housing box itself comprises a top 40, a back 42, a pair of oppositely disposed ends 44, a bottom 46, and a terminal housing hinged cover 48. As seen in the sectional view of FIG. 3, the terminal block 38 is maintained in spaced apart relation from back 42 by the terminal block fins shown as cross hatched protrusions from back 42.

As clearly shown in several drawing figures, but with specific reference to the views of FIGS. 11, 12 and 13, it can be seen that splicing housing hinged cover 36 and terminal housing hinged cover 48 each comprises a plurality of hinge sleeves 50 and 52, respectively, formed in spaced apart relation along the hinged edges. The spacing between respective hinge sleeves 50 and 52 is such that sleeves 50 and sleeves 52 alternate along the length of their common hinge pin 54. Splicing housing hinge sleeve 50 has a slot 56 formed therein, and terminal housing hinge sleeve 52 has a similar slot 58 formed therein. The interior of each of the slots 56 and 58 is dimensioned and configured to pivot about the common hinge pin 54. By virtue of this construction of the hinge sleeves 50 and 52 as including their respective slots 56 and 58, hinged covers 36 and 48 may be formed without the necessity of utilizing a core pin in the die casting machines. This is not only extremely efficient and economical, but still provides an extremely durable hinge connection.

Figure 4:
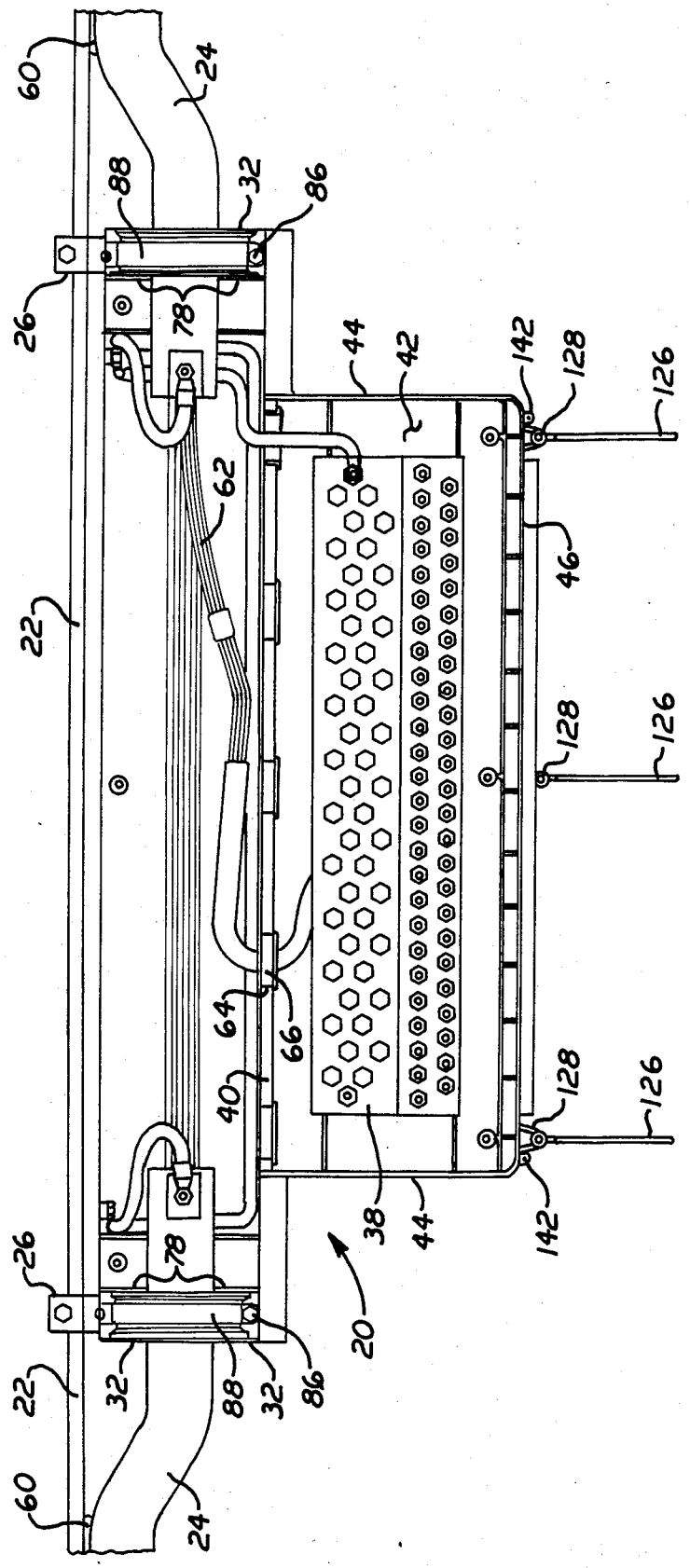
FIG. 4 is a sectional view taken along line 4—4 of FIG. 3.

Referring again to the view of FIG. 1, it can be seen that the standard telecommunication cable is of a so called figure eight configuration, and in such cables, first segment 24 and second segment 22 are joined to each other as by cable web 60. As shown in the view of FIG. 1, web 60 is separated so that first cable segment 24 may be inserted through the splicing housing for the purpose of operatively connecting wire pairs 62 contained within first segment 24 to the standard terminal block 38. Such splicing is accomplished according to standard installation procedures, and the spliced wire pairs 62 are then passed through an aperture 64 from the splicing housing to the terminal housing for operative connection to the terminal block 38. This is illustrated in the view of FIG. 4. In the view of FIG. 4, it can be seen that the aperture between the splicing housing enclosure and the terminal housing box is fitted with a grommet 66 mounted within aperture 64. It can also be seen that a plurality of apertures 64 are provided, though all may not be utilized.

Figure 3:
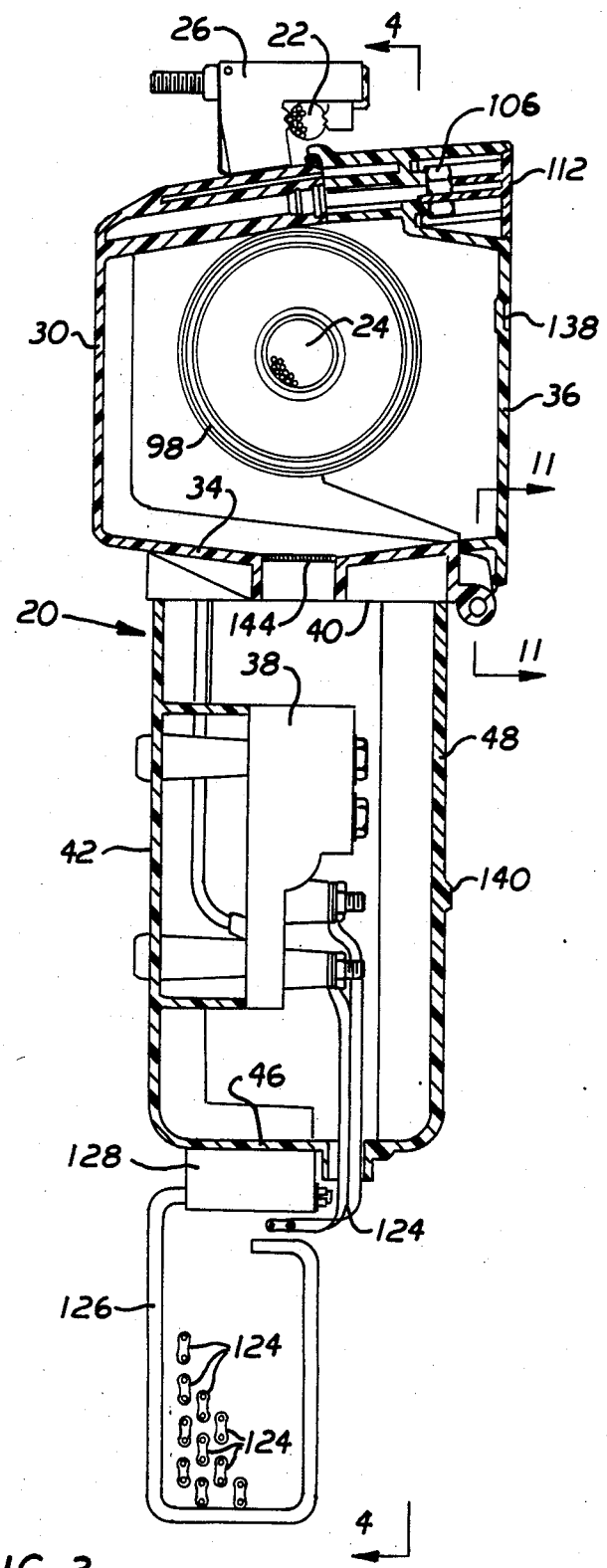
FIG. 3 is a sectional view taken along line 3—3 of FIG. 1.
Figure 5:
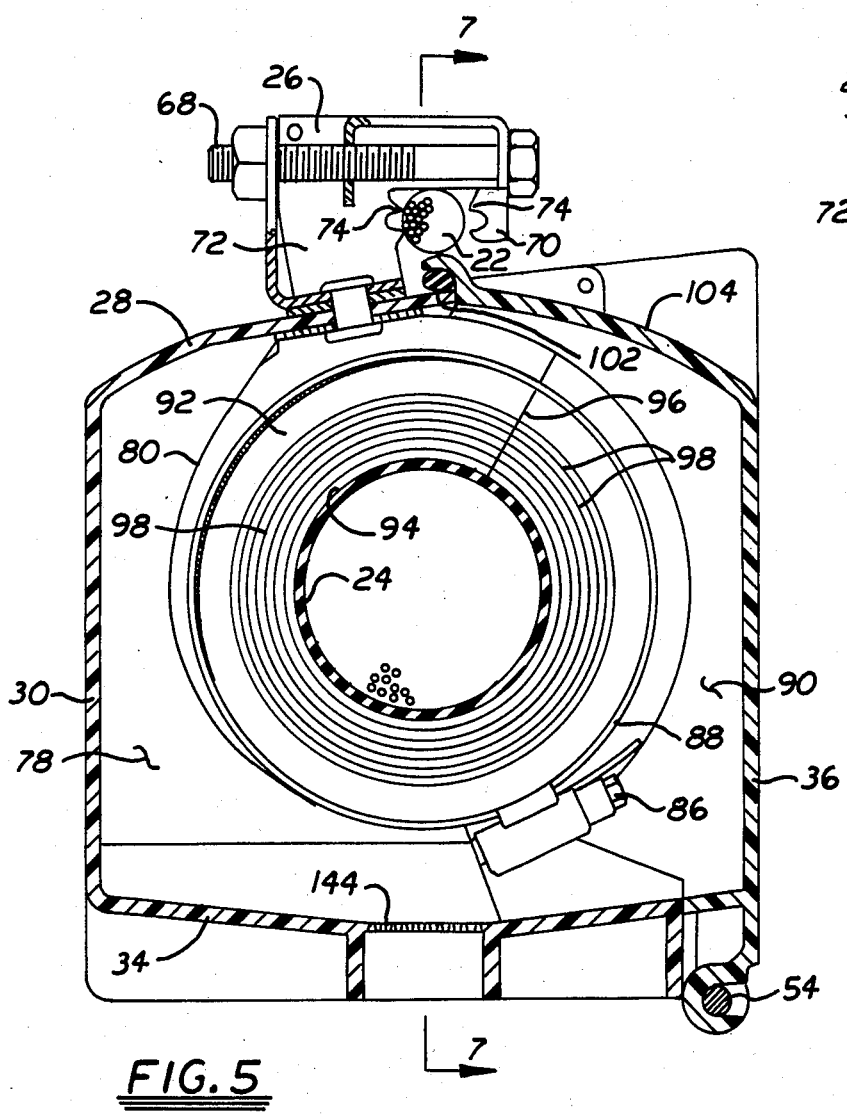
FIG. 5 is a sectional view taken along line 5—5 of FIG. 1.
Figure 6:
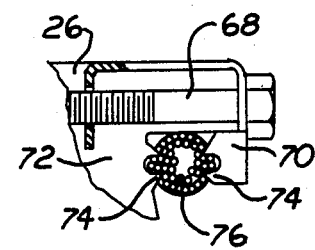
FIG. 6 is a sectional view taken along line 6—6 of FIG. 1.

Referring to the views of FIGS. 3, 5 and 6, details of the construction and utilization of clamping means 26 may be observed. Clamping means 26 comprises a threaded fastener 68 whereby a first jaw 70 may be moved toward a second jaw 72 with second segment 22 disposed between the jaws 70 and 72. Each of the jaws 70 and 72 includes toothed portions 74 which will, as shown in the view of FIG. 6, pierce the insulation surrounding second segment 22 and contact the wires 76 contained therein. Because clamping means 26 is formed from a conductive material, an electrical, grounding connection is made with wires 76 of second segment 22. Once threaded fastener 68 has been tightened as illustrated in the view of FIG. 6, aerial terminal 20 will hang securely from second segment 22 and aerial terminal 20 may be electrically grounded thereto.

As perhaps best seen in the views of FIGS. 5 and 7, fins 78 are formed on the interior of the splicing housing enclosure and are apertured as by curve 80 in corresponding fashion to aperture 82 formed through each of the end walls 32. Thus, a channel 84, best seen in the view of FIG. 7, is defined between each of the end walls 32 and their corresponding fin 78. A seal clamp comprising a threaded fastener 86 and a band 88 is disposed within channel 84. Cover fins 90 are similarly formed on the interior of splicing housing hinged cover 36, and cover fins 90 are substantially mirror images of fins 78. Of course, as can be seen in the view of FIG. 1, the purpose of the apertures through the end walls 32 is to permit passage of first telecommunication cable segment 24 through the interior of the splicing housing.

In order to obtain a weathertight seal at each end of the splicing housing, a plurality of sealing sleeves 92 are provided, with at least one sealing sleeve being disposed in surrounding relation to first segment 24 at each end of the splicing housing enclosure. The sealing sleeves 92 are also best seen in the views of FIGS. 5 and 7. Sealing sleeves 92 are formed from a pliant material and comprise a substantially circular aperture 94 formed axially therethrough. Each of the sleeves 92 further comprises a radial slit 96 extending from aperture 94 to the perimeter of sleeve 92. By opening slit 96, the sleeve 92 may be disposed in surrounding relation to first cable segment 24. Each of the sleeves 92 further comprises a plurality of concentric, radially spaced apart cuts 98 extending partially through the sleeve 92, as seen in the sectional view of FIG. 7, whereby the size of aperture 94 may be increased by completing one of the cuts 98. This permits a single sealing sleeve 92 to surround completely telecommunication cables of different diameters. In use, then, aperture 94 of each sealing sleeve 92 is sized as appropriate to surround first segment 24 of the telecommunication cable. Each of the sleeves 92 is then placed within band 88 of its corresponding seal clamp, and threaded fastener 86 is tightened until sealing sleeve 92 is clearly compressed into intimate, surrounding, weathertight contact with the exterior surface of first segment 24. Referring to the fragmentary sectional view of FIG. 9, it can also be seen that each of the sleeves 92 is provided with a sealing lip 100 to further enhance the weathertight seal provided by the sealing sleeves 92 when installed around first segment 24 and when hinge cover 36 is closed as shown in the view of FIG. 5.

Final weathertight integrity for the interior of the sealing housing enclosure is provided by sealing gasket 102 disposed along the open edge of top wall 28 in abutting relation to the corresponding edge of top segment 104 of hinged cover 36. This, too, is illustrated in the view of FIG. 5.

Having thus installed first segment 24 within the splicing housing, including appropriate grounding connections and splicing operations, as shown in the view of FIG. 4, closing and fastening hinged cover 36 will provide a virtually weathertight enclosure surrounding the spliced first segment 24. Ventilation slots 144 are formed through bottom wall 34 of the splicing housing in order to permit accumulated moisture to drain therefrom. The slots 144 are sufficiently small to impede the entry of insects therethrough.

Figure 8:
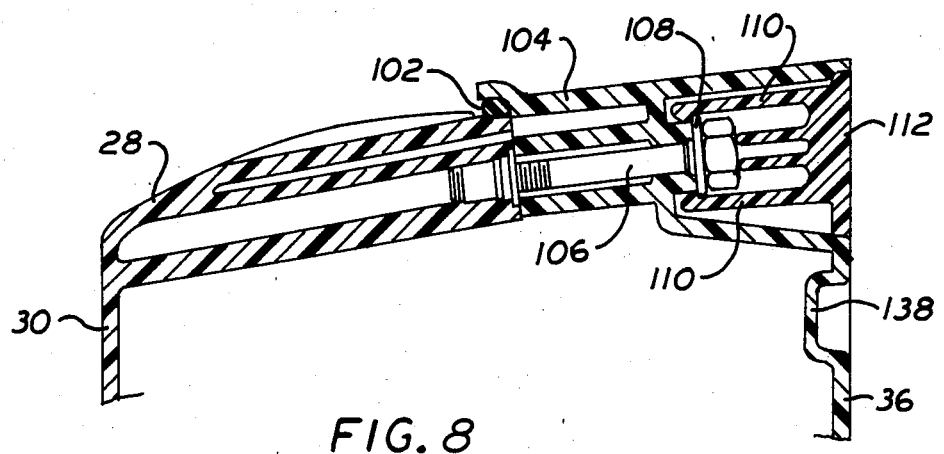
FIG. 8 is a sectional view taken along line 8—8 of FIG. 1.

Referring to the views of FIGS. 3 and 8, a preferred embodiment for fastening hinged cover 36 is disclosed as comprising a threaded fastener 106. Securely tightening threaded fastener 106 closes the splicing housing enclosure. It should be noted that disposed between the head of threaded fastener 106 and the contact surface of hinged cover 36 is a washer 108. As best seen in the view of FIG. 8, washer 108 is positively engaged by legs 110 extending from head 112 defining the structure of a security cap which may be locked into position to prevent reopening of the splicing housing. It is to be understood, then, that the length of legs 110 is critical and is predetermined with regard to the position of washer 108 when threaded fastener 106 is correctly tightened to close hinged cover 36. Furthermore, according to the preferred embodiment, the safety cap is formed from a material of a color different from that of hinged cover 36 so that the integrity of the splicing housing may be visually observed. Of course, the safety caps are not required, but are used in those installations wherein a permanently secured splicing housing is required.

An alternate embodiment for a positive lock of hinged cover 36 is illustrated in the view of FIG. 14. According to this alternate embodiment, a lock pin 114 having a barb 116 formed on its distal end is inserted through hinged cover 36. Barb 116 of the lock pin 114 engages a corresponding tip 118 formed on the interior of top wall 28, thereby positively and permanently securing the splicing housing enclosure.

Referring now to the views of FIGS. 1 and 4, it is to be understood that the size of the terminal housing box may be varied dependent upon the number of subscriber lines to be connected thereto. A standard terminal block 38 corresponding to the maximum required subscriber lines is installed, and standard electrical connections are made, including electrical grounding connections, according to normal industry practice.

The perspective view of FIG. 10 clearly illustrates the construction of a plurality of drop wire slots 120 which are formed through bottom 46 of the terminal housing box. Each of the slots 120 is defined by an opposed pair of lips 122. Each of the lips 122 is flexible to permit insertion of a drop wire 124 therein. The slots 120 also function as ventilation slots for the terminal housing and are normally closed because of their flexible construction. As seen in the fragmentary section of FIG. 10, when terminal housing hinged cover 48 is opened one end of each drop wire slot 120 is open for ease in inerting a drop wire 124 therein. Though not shown in the view of FIG. 10, each of the drop wires 124 is electrically connected to a corresponding pair of terminals on standard terminal block 38. This may be seen in the view of FIG. 3. This construction of aerial terminal 20 to include drop wire slots 120 is quite significant and provides a substantial advantage over current terminal constructions.

Referring next to the view of FIGS. 1, 3 and 4, it can be seen that aerial terminal 20 further comprises a plurality of wire straps 126 depending from the exterior of bottom 46 of the terminal housing box. Each of the wire straps 126 is of substantially U-shaped configuration, and one leg of each strap 126 is attached to bottom 46 as by bracket 128. The other leg of each wire strap 126 is open, whereby drop wires 124 may easily be placed therein. Once the attachment of each of the drop wires 124 to appropriate terminals on standard terminal block 38 has been completed, terminal housing hinged cover 48 is closed and secured by suitable fastening means 130.

At this point, it should be noted that according to the preferred construction for aerial terminal 20, each of the various fastening means, including clamping means 26 and threaded fastener 86, is preferably of a common construction and configuration so that a single tool may be utilized throughout the entire installation and connection procedure. This is illustrated in the phantom portion of FIG. 1 by tools 132, 134 and 136 as well as the phantom lines extending therefrom.

Referring to the view of FIG. 3, it can be seen that a dimple 138 is formed on the surface of splicing housing hinged cover 36. A protrusion 140 is formed on the exterior surface of terminal housing hinged cover 48. The relative placement and configuration of both dimple 138 and protrusion 140 are corresponding so that they will engage each other when either of the hinged covers 36 or 48 is opened. Accordingly, it is the purpose of dimple 138 and protrusion 140 to hold, primarily, terminal housing cover 48 in its open position for ease of access to the terminal block 38. The terminal housing may also be provided with corresponding aperture tabs 142 on bottom 46 and hinged cover 48 as shown in the views of FIGS. 1 and 4. These corresponding apertured tabs 142 may be utilized for placing a standard security seal therein. It is also to be understood that standard surge protection may be provided by appropriate modification of the standard terminal block 38 according to known procedures.

It will thus be seen that the objects set forth above, among those made apparent from the preceding description, are efficiently attained; and since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. An aerial terminal for telecommunication cables, said aerial terminal comprising: a splicing housing defined by an enclosure dimensioned and configured to receive a first segment of a telecommunication cable therein; a plurality of clamping means attached to the exterior of said splicing housing whereby said aerial terminal may be suspended from a second segment of the telecommunication cable; a terminal housing depending from said splicing housing, said terminal housing being defined by a box the top of which is congruent with at least a portion of said enclosure defining said splicing housing, a plurality of apertures being formed through said congruent portions whereby the interior of said splicing housing and said terminal housing are in communicating relation to each other, the interior of said terminal housing having a telecommunication terminal block mounted therein whereby pairs of telephone wires contained within the first segment of the telecommunication cable may be operatively connected to subscriber drop wires; said aerial terminal further comprising a plurality of drop wire slots formed through said terminal housing box and a plurality of wire straps depending from said terminal housing box to receive and support subscriber drop wires; both said splicing housing and said terminal housing having hinged covers thereon whereby access to the interior of each of said housings may be obtained; said splicing housing further comprising at least a pair of sealing sleeves for surrounding the first segment of the telecommunication cable, one of said sleeves being disposed at each end of said splicing housing enclosure.

2. An aerial terminal as in claim 1 wherein said enclosure is defined by a top wall, a back wall, a pair of oppositely disposed end walls, a bottom wall, and said splicing housing hinged cover.

3. An aerial terminal as in claim 2 wherein said clamping means are attached to said enclosure top wall.

4. An aerial terminal as in claim 3 wherein said clamping means comprise an adjustable toothed member whereby said clamping means may be fastened to the second segment of the telecommunication cable such that said toothed member will pierce insulation around the second segment and will electrically contact a metal core of the second segment.

5. An aerial terminal as in claim 2 wherein each of said end walls is apertured to permit the first segment of the telecommunication cable to pass through said enclosure.

6. An aerial terminal as in claim 5 further comprising at least a pair of fins formed on the interior of said enclosure, one of each of said fins being formed on the interior of said enclosure in spaced relation to a corresponding one of said end walls, each of said fins being apertured in corresponding fashion to its end wall, whereby a channel is defined between each of said end walls and its said corresponding fin.

7. An aerial terminal as in claim 6 further comprising a seal clamp operatively mounted at least partially within each of said channels.

8. An aerial terminal as in claim 7 wherein one of each of said pair of sealing sleeves may be held within a corresponding one of said seal clamps, whereby upon tightening said clamps and closing said splicing housing hinged cover, a substantially weathertight seal will be formed between said end walls and said sealing sleeves and between said sealing sleeves and the first segment of the telecommunication cable when extending through the sleeves.

9. An aerial terminal as in claim 8 wherein each of said sealing sleeves is formed from a pliant material and comprises a substantially circular aperture formed axially therethrough, each of said sleeves further comprising a radial slit extending from said aperture to the perimeter of said sleeve, whereby the first segment of the telecommunication cable may be disposed within each one of said sleeves.

10. An aerial terminal as in claim 9 wherein each of said sealing sleeves further comprises a plurality of concentric, radially spaced apart cuts extending partially through said sleeve, whereby the size of said circular aperture may be increased by completing one of said cuts, thereby permitting said sleeve to surround segments of telecommunication cables of different diameters.

11. An aerial terminal as in claim 10 wherein said splicing housing hinged cover comprises a top segment, a cover front extending relatively downwardly from said top segment, and oppositely disposed cover ends extending tranversely from said cover front, said cover being hingedly attached to the edge of said bottom wall opposite from said back wall.

12. An aerial terminal as in claim 11 wherein each of said cover ends is apertured in substantially mirror image relation to said end walls.

13. An aerial terminal as in claim 12 wherein said splicing housing hinged cover further comprises at least a pair of cover fins formed on the inside of said top segment and said cover front, one of each of said cover fins being formed in spaced relation to a corresponding one of said cover ends, each of said cover fins being apertured in corresponding fashion to its cover end, whereby a cover channel is defined between each of said cover ends and its said corresponding fin.

14. An aerial terminal as in claim 13 further comprising a sealing gasket disposed along the open edge of said top wall in abutting relation to the corresponding edge of said cover top segment when said cover is closed, whereby a substantially weathertight seal is formed therebetween.

15. An aerial terminal as in claim 14 further comprising a plurality of fastening means whereby said splicing housing hinged cover may be secured to close said splicing housing.

16. An aerial terminal as in claim 15 further comprising a plurality of security caps, one of each of said caps being attachable to a corresponding one of said fastening means whereby said fastening means is rendered inaccessible.

17. An aerial terminal as in claim 16 wherein each of said security caps comprises a head portion whereby access to said fastening means is blocked, and a plurality of cap legs extending in substantially transverse relation to said head portion, the distal end of each of said legs being dimensioned and configured to engage said fastening means and hold said security cap thereon.

18. An aerial terminal as in claim 13 further comprising a plurality of ventilation slots formed through said bottom wall of said enclosure.

19. An aerial terminal as in claim 2 wherein said box is defined by a top, a back, a pair of oppositely disposed ends, a bottom, and said terminal housing hinged cover.

20. An aerial terminal as in claim 19 wherein said top is mechanically fastened to said bottom wall of said enclosure defining said splicing housing.

21. An aerial terminal as in claim 20 wherein said splicing housing hinged cover and said terminal housing hinged cover both pivot about a common hinge pin.

22. An aerial terminal as in claim 21 wherein said splicing housing hinged cover and said terminal housing hinged cover each comprises a plurality of hinge sleeves formed in spaced apart relation along the hinged edges thereof, the spacing of said hinge sleeves being such that said splicing housing cover hinge sleeves alternate with said terminal housing cover hinge sleeves, each of said hinge sleeves having a slot formed therein, the interiors of said slots being dimensioned and configured to pivot about said common hinge pin.

23. An aerial terminal as in claim 21 wherein said drop wire slots are formed through said bottom of said box defining said terminal housing.

24. An aerial terminal as in claim 23 wherein each of said drop wire slots is defined by an opposed pair of lips.

25. An aerial terminal as in claim 24 wherein each of said lips is flexible.

26. An aerial terminal as in claim 21 further comprising a plurality of ventilation apertures formed through said bottom of said box.

27. An aerial terminal as in claim 26 wherein said ventilation apertures are defined by said drop wire slots.

28. An aerial terminal as in claim 21 wherein said wire straps depend from the exterior of said bottom of said box.

29. An aerial terminal as in claim 28 wherein each of said wire straps is of substantially U-shaped configuration.

30. An aerial terminal as in claim 29 wherein one leg of each of said wire straps is attached to said bottom and the other of said legs is open, whereby the subscriber drop wires may be placed within said wire straps.

31. An aerial terminal as in claim 21 further comprising a plurality of terminal block fins formed on the interior of said box whereby the terminal block may be mounted therein in spaced apart relation from said back.

32. An aerial terminal as in claim 21 further comprising a plurality of terminal fasteners whereby said terminal housing hinged cover may be secured to close said terminal housing.

* * * * *